(12) United States Patent
Szentmihalyi

(10) Patent No.: US 8,277,330 B2
(45) Date of Patent: Oct. 2, 2012

(54) CONNECTING ARRANGEMENT BETWEEN SHAFT JOURNAL AND CONSTANT VELOCITY ROTARY JOINT

(75) Inventor: Volker Szentmihalyi, Gutach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 13/240,381

(22) Filed: Sep. 22, 2011

(65) Prior Publication Data
US 2012/0010008 A1    Jan. 12, 2012

Related U.S. Application Data

(63) Continuation of application No. PCT/DE2010/000248, filed on Mar. 8, 2010.

(30) Foreign Application Priority Data

Apr. 3, 2009 (DE) .......................... 10 2009 016 066

(51) Int. Cl.
*F16D 1/116* (2006.01)

(52) U.S. Cl. ....................................................... 464/182

(58) Field of Classification Search .................. 464/182, 464/904, 905, 906; 403/1, 286, 293, 303–305, 403/308, 315, 316, 319
See application file for complete search history.

(56) References Cited

U.S. PATENT DOCUMENTS

| 2,089,168 | A | * | 8/1937 | Brown |
| 3,995,897 | A | * | 12/1976 | Paskert |
| 4,756,640 | A | | 7/1988 | Gehrke |
| 4,813,808 | A | * | 3/1989 | Gehrke ...................... 464/906 X |
| 5,807,180 | A | * | 9/1998 | Knodle et al. ............. 464/906 X |
| 6,158,916 | A | * | 12/2000 | Wormsbaecher ......... 464/906 X |
| 6,390,925 | B1 | * | 5/2002 | Perrow ....................... 403/316 X |
| 7,850,531 | B2 | * | 12/2010 | Brunetti et al. ........... 464/182 X |
| 8,025,454 | B2 | * | 9/2011 | Cermak ........................ 403/319 |
| 2005/0192106 | A1 | | 9/2005 | Cermak |

FOREIGN PATENT DOCUMENTS

| DE | 10 2004 009 477 A1 | 9/2005 |
| GB | 1 447 078 A | 8/1976 |
| WO | WO 01/84003 A1 | 11/2001 |
| WO | WO 2009/012767 A2 | 1/2009 |

OTHER PUBLICATIONS

Gloaguen, Didier, "Retaining Ring for Constant Velocity Joint", Research Disclosure, Mason Publications, Hampshire, GB, Bd. 384, Nr. 8, Apr. 1, 1996, XP007120987 (two (2) pages).
International Search Report including English language translation dated Jun. 10, 2010 (Six (6) pages).

* cited by examiner

*Primary Examiner* — Gregory Binda
*Assistant Examiner* — Matthieu Setliff
(74) *Attorney, Agent, or Firm* — Crowell & Moring LLP

(57) ABSTRACT

A connecting arrangement between a shaft journal and a constant velocity rotary joint having a joint inner part and a joint outer part, in which the shaft journal engages in a rotationally fixed manner in one of the joint parts, and the shaft journal and the constant velocity rotary joint are two components. At least one clamping sleeve is provided which is axially secured on one of the components, and which includes at least one elastic element which can lock in place in a contour of the other component.

10 Claims, 3 Drawing Sheets a)

b)

c)

a)

b)

c)

CONNECTING ARRANGEMENT BETWEEN SHAFT JOURNAL AND CONSTANT VELOCITY ROTARY JOINT

CROSS REFERENCE TO RELATED APPLICATIONS

This application is a continuation of international patent application no. PCT/DE2010/000248, filed Mar. 8, 2010, designating the United States of America and published in German on Oct. 7, 2010 as WO 2010/111990, the entire disclosure of which is incorporated herein by reference. Priority is claimed based on Federal Republic of Germany patent application no. DE 10 2009 016 066.3, filed Apr. 3, 2009, the entire disclosure of which is likewise incorporated herein by reference.

BACKGROUND OF THE INVENTION

This invention relates to a connecting arrangement between a shaft journal and a constant velocity rotary joint comprising a joint inner part and a joint outer part, wherein the shaft journal and the constant velocity rotary joint are two distinct components, and the shaft journal engages in a rotationally fixed manner in the joint inner part of the constant velocity joint. A connecting arrangement of this type is described in published international patent application no. WO 2009/012767.

SUMMARY OF THE INVENTION

It is an object of the invention to provide a new alternative connecting arrangement for connecting a shaft journal to a constant velocity rotary joint.

This object is achieved in accordance with the present invention by providing at least one clamping sleeve which is axially secured on one of the components and which comprises at least one elastic element which can lock in place in a contour of the other component.

According to the invention, the shaft and the joint are secured to one another by a clamping sleeve which is axially secured on one component and which locks in place in a contour of the other component, i.e. is also de facto axially secured. In other words, the clamping sleeve, in its installed state, is fixed in both components against axial movement and thus clamps both components relative to one another. The at least one elastic element facilitates the transition to the fixed state during assembly.

One embodiment of the invention provides that the shaft journal is axially fixed. For the most part, during assembly with the joint, the shaft journal does not allow any further axial movement, so that said journal is fixed in the axial position.

Another embodiment of the invention provides that the axial securing of the clamping sleeve is effected on one of the components by the elastic element.

Another embodiment of the invention provides that the elastic element is integral with the clamping sleeve.

Another embodiment of the invention provides that the clamping sleeve comprises at least two elastic elements. The clamping sleeve therefore preferably comprises a plurality of elastic elements.

Another embodiment of the invention provides that the at least two elastic elements are radially resilient elastic elements, such as tongues, fins, collars or the like, distributed around the periphery of the clamping sleeve.

Another embodiment of the invention provides that the at least two elastic elements engage the two components in the axial direction in an interlocking manner. The two components or their contours and the configuration of the clamping sleeve or particularly the elastic elements thereof are therefore constructed complementary to one another such that an interlocked form fit is produced.

Another embodiment of the invention provides that the at least two elastic elements clamp the two components in the axial direction. This preferably relates to the axial direction defined by the shaft associated with the shaft journal.

Another embodiment of the invention provides that the two components can be clamped against one another in the axial direction.

Another embodiment of the invention provides that the clamping sleeve comprises at least one securing region, especially a radially inwardly extending securing region. In one embodiment, the securing region pertains to the radially inwardly extending edges of the elastic elements which, in particular, have a tongue-shaped configuration.

Another embodiment of the invention provides that the axial securing of the clamping sleeve on one of the components is effected by pushing the clamping sleeve axially along a first, particularly axial, displacement region on the component and locking the at least one securing region in place in a region having a reduced diameter relative to the displacement region.

In one embodiment, the component has a groove extending around the outer surface thereof, into which the securing region of the clamping sleeve is introduced. This introduction is enabled, in particular, by the elastic elements which permit displacement over the region having the larger diameter.

Another embodiment of the invention provides that the locking of the clamping sleeve, which is axially secured on one of the components, into place on the other component is carried out after being moved along a second, particularly axial, displacement region on the other component into a contour which has a reduced diameter relative to the diameter of the second displacement region. For example, the other component may have an edge of smaller diameter arranged behind a larger diameter starting region of the other component.

In one embodiment, the clamping sleeve has a suitable chamfer at an end region which is pushed over the other component. In particular, the clamping sleeve at the end facing toward the other component has a second securing region which locks in place in the contour of the other component after displacement along the second displacement region.

Another embodiment of the invention provides that the clamping sleeve is axially secured on one of the joint parts.

Another embodiment of the invention provides that the clamping sleeve is axially secured on the joint inner part.

Another embodiment of the invention provides that the clamping sleeve is axially secured on the joint outer part.

Another embodiment of the invention provides that the clamping sleeve is axially secured on the shaft journal.

The invention also relates to a jointed shaft for a drive train of a vehicle having at least one connecting arrangement according to one of the preceding embodiments.

BRIEF DESCRIPTION OF THE DRAWINGS

The invention will be described in further detail hereinafter with reference to illustrative embodiments shown in the accompanying drawings figures, in which.

DETAILED DESCRIPTION OF ILLUSTRATIVE EMBODIMENTS

Figure 1:
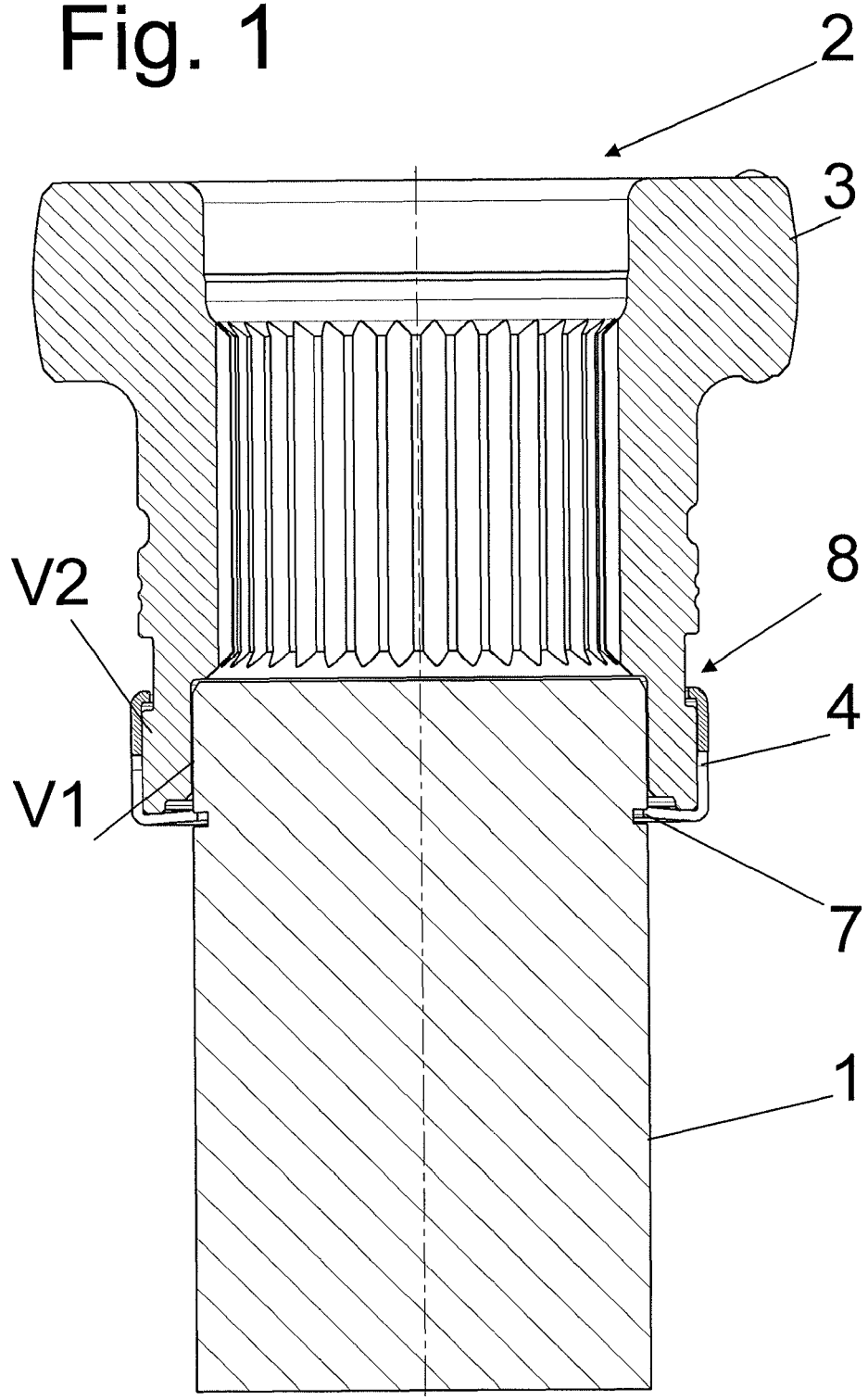
FIG. 1 is a section through a connecting arrangement according to the invention.

The establishment of the connecting arrangement according to the invention will now be described in principle based on the sectional view of the embodiment of FIG. 1. For further details, reference is made to the published application WO 2009/012767. The shaft journal 1 has a contour which permits the locking into place of the clamping sleeve 4. In the embodiment shown herein, this contour is a groove 7 which is introduced into the essentially rotationally symmetrical shank of the shaft. In a first step, the clamping sleeve 4 is therefore pulled over the first displacement region V1 until the securing region 6 is secured in the groove 7 due to the smaller diameter of the securing region and is secured there against axial movement. The displacement along the first displacement region V1 is made possible by the elastic elements of the clamping sleeve 4 which permit expansion of the internal radius of the clamping unit 4 for the displacement. In the next step, the constant velocity rotary joint 2, of which only the joint inner part 3 is shown here, is placed over the shaft journal 1, or the shaft journal 1 is introduced into the joint inner part 3. Once the end region of the constant velocity rotary joint 2 comes into contact with the end of the clamping sleeve 4 facing toward the joint, the internal diameter of the clamping sleeve 4 is also expanded there via the elastic elements, and the sleeve 4 can be pushed along the second displacement region V2 over the end of the constant velocity rotary joint 2. For this purpose, the clamping sleeve 4 preferably is provided with a suitable chamfer. Once the end of the clamping sleeve 4 reaches the edge 8 of the constant velocity rotary joint 2, the second securing region, which is shown here as a narrow shoulder, snaps into place. Associated with this is the fact that the contour of the constant velocity rotary joint 2, the shape of the shaft journal 1 and the shape of the clamping sleeve are suitably matched to one another. As can be seen, the height of the clamping sleeve 4 here corresponds to the distance between the end regions of the sections of the contours of both components—shaft journal 1 and constant velocity rotary joint 2—facing one another and connected to one another by the clamping sleeve 4 into which contours, respectively, the clamping sleeve 4 locks.

Since both components are axially clamped against one another here, the assembly sequence can also be reversed. In particular, the connection according to the invention using the clamping sleeve 4 allows the connection to be released again. This is achieved, for example, by pushing axially, so that once a particular distance is exceeded, the elastic elements 5 spring out of one of the contours of the two components, i.e. either the groove 7 or the edge 8.

Figure 2:
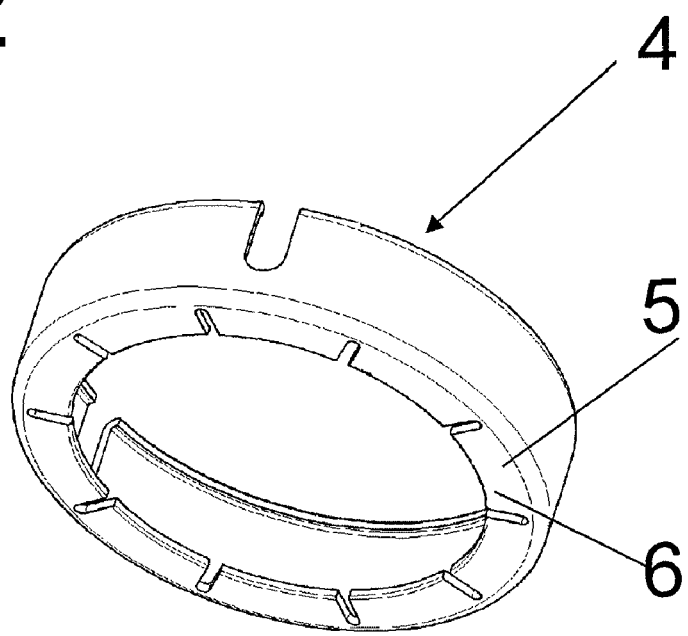
FIGS. 2a) to c) are representations of a first variant of a clamping sleeve, and FIGS. 3a) to c) are representations of a second variant of the clamping sleeve.
Figure 2:
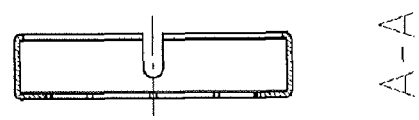
Figure 2:
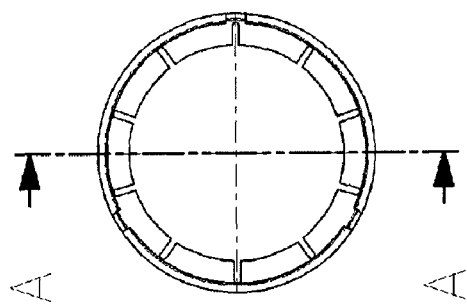

FIG. 2 shows a variant of the clamping sleeve 4, and FIG. 2a) shows a three-dimensional representation thereof. The clamping sleeve 4 is similar to a milk bottle closure, the center of which—circular in this case—has an opening. Shown here is the securing region 6, which is a radially inwardly extending edge. The securing region 6 has cut-outs which contribute, together with the design of the material used, thereto that the securing region 6 also functions as elastic elements 5. These elastic elements 5 can be bent radially outwardly and thus enable displacement of the clamping sleeve 4 along a region having a larger outer diameter than the inner diameter of the clamping sleeve 4 or of the securing region 6. The elements 5 are, in particular, elastically deformable so as to lock in place, ideally, in a region of smaller diameter. The longitudinal sides of the clamping sleeve 4 also have notches here. These notches are visible, in section in FIG. 2b), along the line A-A in the plan view of FIG. 2c). These cut-outs in the height of the clamping sleeve 4 create elastic elements at this end of the clamping sleeve 4, so that the sleeve 4 can also be pulled with this end over regions of larger diameter so that the second securing region, which is arranged axially opposite the first securing region and is visible here as a narrow edge, can lock in place in a further contour of a component.

Figure 3:
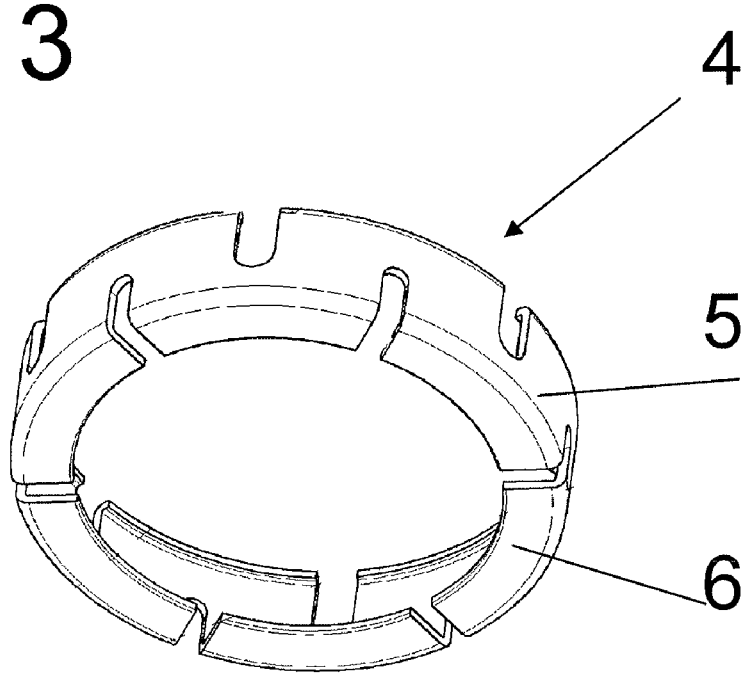
Figure 3:
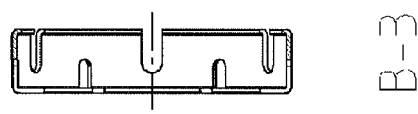
Figure 3:
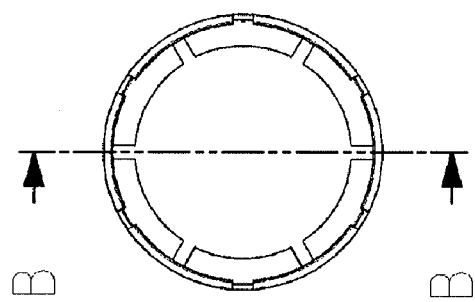

Similarly to FIGS. 2a) to c), FIGS. 3a) to c) show a second variant of the clamping sleeve 4. In this embodiment, the notches at the two edges of the sleeve 4 are deeper than the variant of FIG. 2 (see, in particular, FIG. 3b)). The result is a greater springing effect in the elastic elements 5.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A connecting arrangement for connecting a shaft journal and a constant velocity rotary joint comprising a joint inner part and a joint outer part, wherein:

the shaft journal and the constant velocity rotary joint are two distinct components;

the shaft journal engages in a rotationally fixed manner in one of the joint parts;

at least one clamping sleeve is provided which is axially secured on one of the components, wherein the clamping sleeve is axially secured on one of the components via elastic elements which are formed by cut-outs on a radially extending securing region of said clamping sleeve, the clamping sleeve comprises elastic elements formed by notches in longitudinal sides of said clamping sleeves which can via one narrow shoulder lock in place in a contour of the other component, said elastic elements are integral with the clamping sleeve, radially resilient, distributed around the periphery of the clamping sleeve, and comprise tongues, and the clamping sleeve engages the shaft journal and the constant velocity rotary joint in axially separate locations which do not overlap one another.

2. The connecting arrangement as claimed in claim 1, wherein the shaft journal is axially fixed.

3. The connecting arrangement as claimed in claim 1, wherein the at least two elastic elements engage the two components in the axial direction in a form-fitting manner.

4. The connecting arrangement as claimed in claim 1, wherein the at least two elastic elements clamp the two components in the axial direction.

5. The connecting arrangement as claimed in claim 4, wherein the two components can be clamped against one another in the axial direction.

6. The connecting arrangement as claimed in claim 5, wherein the axial securing of the clamping sleeve on one of the components is effected by pushing the clamping sleeve axially along a first axial, displacement region on the component and locking the at least one securing region in place in a region having a reduced diameter relative to the displacement region.

7. The connecting arrangement as claimed in claim 1, wherein the locking of the clamping sleeve, which is axially secured on one of the components, into place on the other component is carried out after being moved along a second axial displacement region on the other component into a contour having a reduced diameter relative to the diameter of the second displacement region.

8. The connecting arrangement as claimed in claim 1, wherein the clamping sleeve is axially secured on one of the joint parts.

9. The connecting arrangement as claimed in claim 1, wherein the clamping sleeve is axially secured on the shaft journal.

10. A jointed shaft for a drive train of a vehicle comprising at least one connecting arrangement as claimed in claim 1.

* * * * *